US012700010B2

(12) United States Patent
Ryle et al.

(10) Patent No.: US 12,700,010 B2
(45) Date of Patent: Aug. 4, 2026

(54) DETERMINATION OF PRODUCT AUTHENTICITY

(71) Applicant: EATON INTELLIGENT POWER LIMITED, Dublin (IE)

(72) Inventors: James Ryle, Dublin (IE); Padhraig Ryan, Keatingstown (IE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 23 days.

(21) Appl. No.: 18/686,524

(22) PCT Filed: Oct. 1, 2021

(86) PCT No.: PCT/EP2021/077120
§ 371 (c)(1),
(2) Date: Feb. 26, 2024

(87) PCT Pub. No.: WO2023/051936
PCT Pub. Date: Apr. 6, 2023

(65) Prior Publication Data
US 2024/0378626 A1 Nov. 14, 2024

(51) Int. Cl.
*G06Q 30/018* (2023.01)
*G06V 10/44* (2022.01)
(Continued)

(52) U.S. Cl.
CPC ......... *G06Q 30/0185* (2013.01); *G06V 10/44* (2022.01); *G06V 30/224* (2022.01); *G06V 30/413* (2022.01)

(58) Field of Classification Search
CPC ............. G06Q 30/0185; G06V 30/413; G06V 30/224; G06V 10/44
(Continued)

(56) References Cited

U.S. PATENT DOCUMENTS 10,885,531 B2 1/2021 Burgin et al.
2016/0300107 A1* 10/2016 Callegari ............... G06V 20/80
(Continued)

FOREIGN PATENT DOCUMENTS

CN 109685528 A * 4/2019 ....... G06V 30/19173
EP 3627392 A1 3/2020
WO WO-2016060200 A1 * 4/2016 ......... G06Q 30/0627

OTHER PUBLICATIONS

Savage, Neil, "Catching the Fakes: Applying neural networks to images helps identify counterfeit goods", May 1. 2021; cacm.acm.org, 10 pages (Year: 2021).*
(Continued)

*Primary Examiner* — Shannon S Campbell
*Assistant Examiner* — Freda A Nelson
(74) *Attorney, Agent, or Firm* — LEYDIG, VOIT & MAYER, LTD.

(57) ABSTRACT

Some embodiments relate to a method of determining authenticity of a product, such as an electrical product. The method includes acquiring image sensor data indicative of an image including a label including information related to the product. The method includes identifying regions of the label that include information related to the product, and classifying each identified region based on a determined form of information included in the region, by using a trained machine learning model based on the acquired image data. For each classified region of the label, the method involves identifying attributes of the classified region based on the acquired image data, and comparing the identified attributes against respective expected attributes for a label region of an authentic product that includes the determined form of information of the classified region. The method involves providing an indication of authenticity of the product determined based on the comparison.

20 Claims, 4 Drawing Sheets

(51) Int. Cl.
　　*G06V 30/224*　　　　(2022.01)
　　*G06V 30/413*　　　　(2022.01)
(58) Field of Classification Search
　　USPC .......................................................... 705/318
　　See application file for complete search history.

(56) References Cited

U.S. PATENT DOCUMENTS

| | | | |
|---|---|---|---|
| 2017/0093847 A1* | 3/2017 | Vaysman | .............. H04W 12/06 |
| 2019/0012558 A1* | 1/2019 | Dura | .................... G06V 30/412 |
| 2019/0213408 A1 | 7/2019 | Cali et al. | |
| 2020/0059363 A1* | 2/2020 | Lobo | ....................... G06F 16/27 |
| 2020/0394399 A1* | 12/2020 | Gilbert | ................... G06V 10/56 |
| 2021/0142336 A1* | 5/2021 | Suk | ....................... G06F 16/583 |
| 2021/0142337 A1* | 5/2021 | Guinard | ............. G06Q 30/0185 |

OTHER PUBLICATIONS

Oct. 1, 2021 International Search Report.
Oct. 1, 2021 Written Opinion of the International Searching Author-
ity.

\* cited by examiner

201 — AQUIRE IMAGE DATA OF PRODUCT LABEL

202 — IDENTIFY AND CLASSIFY LABEL REGIONS

203 — IDENTIFY ATTRIBUTES OF CLASSIFIED REGIONS AND COMPARE AGAINST EXPECTED ATTRIBUTES

204 — PROVIDE INDICATION OF PRODUCT AUTHENTICITY

301  AQUIRE SENSOR DATA OF PRODUCT EXTERIOR

302  IDENTIFY PRODUCT CATEGORY

303  IDENTIFY PRODUCT ATTRIBUTES AND COMPARE AGAINST EXPECTED ATTRIBUTES

304  PROVIDE INDICATION OF PRODUCT AUTHENTICITY

DETERMINATION OF PRODUCT AUTHENTICITY

CROSS-REFERENCE TO RELATED APPLICATIONS

This application is a national phase filing under 35 C.F.R. § 371 of and claims priority to PCT Patent Application No. PCT/EP2021/077120, filed on Oct. 1, 2021.

TECHNICAL FIELD

The present invention relates generally to determining authenticity of a product and, in particular, to discriminating between authentic and counterfeit products. Aspects of the invention relate to a method, to a portable device, and to a non-transitory, computer-readable storage medium.

BACKGROUND

A counterfeit product is an imitation intended to be passed off fraudulently or deceptively as new or genuine. Counterfeit products are a common problem in markets around the world. In particular, they can impose safety risks for consumers—e.g. because of sub-optimal quality or testing—and can cause ethical, reputational, and financial impacts for companies.

There are various methods for detecting counterfeit goods. For instance, it is known for a product to be marked with one or more codes used to verify its authenticity. In particular, such product markings enable authentication processes aimed at preventing counterfeit versions of a product from entering the market.

It is common for a product to be associated with a unique identifier—for instance, in the form of a serial number—during manufacture of the product, to enable tracking of individual products throughout the manufacturing process and once they enter the market. A barcode—which could be one-dimensional or two-dimensional, such as a Quick Response (QR) code—is often marked or printed on a product, and linked to a website of the product manufacturer or to some other database for checking product authenticity based on the barcode. In particular, a product user may scan the barcode with a camera in a portable or mobile device in order to be automatically and directly taken to the website or other location by the mobile device. A barcode that successfully links to the manufacturer's website may be an indication of the associated product's authenticity, for instance.

One disadvantage of such an authentication process is that barcodes may be replicated relatively easily and encoded with any particular information that is desired. This means it may be relatively simple for someone to print a copied barcode linked to a genuine serial number on a counterfeit product such that it is almost indistinguishable from the genuine product having that serial number.

There is therefore still a need for improved methods of discriminating between authentic and counterfeit products. It is against this background to which the present invention is set.

SUMMARY OF THE INVENTION

According to an aspect of the present invention there is provided a method of determining authenticity of a product. The method comprises: (a) acquiring image data, using an image sensor, indicative of at least one image including a label of the product, the label including information related to the product; (b) identifying one or more regions of the label that include information related to the product, and classifying each identified region based on a determined form of information included in said region, the identification and classification steps being performed by executing a trained machine learning model based on the acquired image data; (c) for each classified region of the label, identifying one or more attributes of said classified region based on the acquired image data, and comparing the identified attributes against respective expected attributes for a label region of an authentic product that includes the determined type of information of said classified region; and, (d) providing an indication of authenticity of the product determined based on the comparison.

The form of information may include at least one of: a character string; a barcode; a Quick Response (QR) code; a logo; and, an image.

Classifying the identified regions of the label may comprise determining coordinates defining a position of each identified region within the label.

The machine learning model may be trained using a training dataset comprising a plurality of training samples each including product label image data and associated classified regions indicating the type of information in the respective regions.

The training dataset may include training samples related to authentic product labels, training samples related to counterfeit product labels, or a combination of both.

The attributes may include content of the information of the classified region within the label. The comparison step may include comparing the content of the classified region relative to expected content of a label region of an authentic product that includes the determined type of information of said classified region.

The content may include at least one of: a serial number; a date code; a catalogue number; a UL (Underwriters Laboratories) certification; product amperage; product temperature rise; product style number; number of poles of products; and, a UPC (Universal Product Code) number.

The attributes may include one or more display characteristics of content in the classified region. The comparison step may include comparing the display characteristics of the classified region relative to expected display characteristics of a label region of an authentic product that includes the determined type of information of said classified region.

The display characteristics may include at least one of colour, size, font, resolution, and fading of the content. Optionally, the content includes one or more alphanumeric or special characters, or a logo or image.

Identifying the attributes may comprise executing an optical character recognition algorithm based on the acquired image data.

The method may comprise: identifying coordinates in the acquired image data that define edges of the label; determining a scaling factor to be applied to the coordinates to obtain a rectangular area defining the label; and, determining an expected error in the step of identifying the attributes of each classified region. The step of identifying the attributes may comprise determining a confidence score associated with the identification. The indication of authenticity may be determined based on the confidence score relative to the expected error.

The attributes may include a position of the classified region within the label. The comparison step may include comparing the position of the classified region relative to an expected position of a label region of an authentic product that includes the determined type of information of said classified region.

The method may comprise: scanning, using a scanning device, a barcode on the label; and, accessing a database to check whether the barcode corresponds to an authentic product. The indication of authenticity of the product may be determined based on the barcode check.

The method may comprise identifying a category of the product, from a plurality of potential product categories, by executing a trained machine learning model based on the acquired sensor data. The expected attributes for each label region may be based on the identified product category.

The label may be a packaging label on packaging of the product, or a nameplate label on a nameplate of the product.

The acquired image data may include data indicative of two or more labels of the product. The method may comprise performing steps (b), (c) and (d) for each of the two or more labels. The method may comprise providing an overall indication of authenticity of the product determined based on the respective indication of authenticity for each of the two or more labels.

The method may comprise: acquiring sensor data indicative of an exterior of the product; identifying a category of the product, from a plurality of potential product categories, by executing a trained machine learning model based on the acquired sensor data; identifying one or more attributes of the product based on the acquired sensor data, and comparing the identified attributes against respective expected attributes for an authentic product in the identified category; and, providing an indication of authenticity of the product determined based on the comparison. The expected attributes may be stored in a database.

The trained machine learning model may be a convolutional neural network model. The model may have elements including convolutional layers, densely connected layers, dropout during training, batch normalisation, multiple branches, and multiple classes.

The one or more attributes may include a colour of at least one part of the product. The comparison step may include comparing the colour determined from the sensor data against an expected threshold colour range of the at least one part for an authentic product. Optionally, the at least one part is a logo or trademark included in the sensor data, or a product housing included in the sensor data.

The method may comprise determining the colour of the at least one part of the product from the sensor data. The determination may be made in dependence on an ambient light level obtained from the sensor data.

The one or more attributes may include one or more dimensions of the product. The comparison step may include comparing the dimensions determined from the sensor data against expected dimensions for an authentic product.

The sensor data may include visual data, acquired from a visual sensor, indicative of a visual of the exterior of the product. Optionally, the visual sensor is the image sensor.

The sensor data may include radar data, acquired from a radar sensor. The one or more attributes may include a shape of the product. The comparison step may include comparing the shape determined from the sensor data against an expected shape for an authentic product.

Identifying the shape of the product may comprise performing a time-of-flight analysis based on the acquired radar data.

The sensor data may include radar data, acquired from a radar sensor. The one or more attributes may include a roughness of an exterior surface of the product. The comparison step may include comparing the roughness determined from the sensor data against an expected surface roughness for an authentic product.

The method may comprise providing an overall indication of authenticity of the product determined based on the respective determined indications of authenticity.

The image sensor may be part of a portable device. Optionally, the image sensor is a camera. Further optionally, the portable device is a mobile phone.

According to another aspect of the invention there is provided a non-transitory, computer-readable storage medium storing instructions thereon that when executed by one or more processors cause the one or more processors to perform a method as described above.

According to another aspect of the invention there is provided a portable device for determining authenticity of a product. The portable device comprises an image sensor configured to acquire image data indicative of at least one image including a label of the product, the label including information related to the product. The portable device comprises a processor configured to: identify one or more regions of the label that include information related to the product, and classify each identified region based on a determined form of information included in said region, the identification and classification steps being performed by executing a trained machine learning model based on the acquired image data; and, for each classified region of the label, identify one or more attributes of said classified region based on the acquired image data, and compare the identified attributes against respective expected attributes for a label region of an authentic product that includes the determined type of information of said classified region. The portable device comprises an output configured to provide an indication of authenticity of the product determined based on the comparison.

According to another aspect of the invention there is provided a method for determining authenticity of a product. The method comprises: acquiring sensor data indicative of an exterior of the product; identifying a category of the product, from a plurality of potential product categories, by executing a trained machine learning model based on the acquired sensor data; identifying one or more attributes of the product based on the acquired sensor data, and comparing the identified attributes against respective expected attributes for an authentic product in the identified category; and, providing an indication of authenticity of the product determined based on the comparison.

BRIEF DESCRIPTION OF THE DRAWINGS

Examples of the invention will now be described with reference to the accompanying drawings, in which.

DETAILED DESCRIPTION

Figure 1:
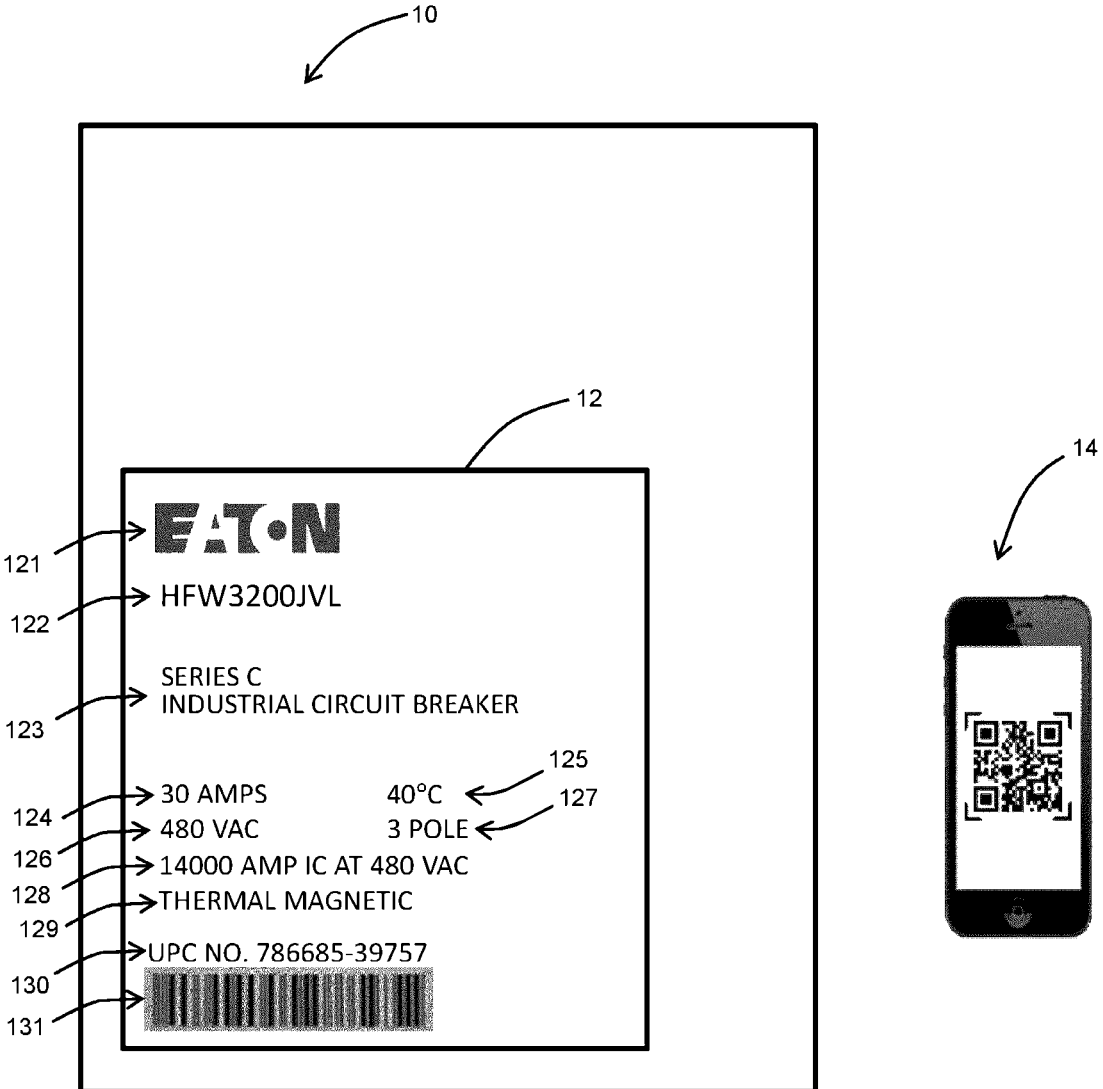
FIG. 1 schematically illustrates a product with a label including information related to the product, and a device including a sensor for acquiring sensor data relating to the product exterior and/or product label.

Counterfeit products are problematic for both consumers and companies because of their safety, ethical, reputational and/or financial impacts. The present invention provides improved methods and systems for determining the authenticity of a product. The invention therefore increases the number of counterfeit products that may be accurately identified and removed from the market or prevented from reaching the market. In this way, the invention can be used to reduce the negative impacts caused by counterfeit products that enter the market. For instance, accurate verification of the authenticity of safety-critical equipment is important to reduce safety risks associated with counterfeit versions of such products.

A product may include one or more labels that provide information related to the product. For instance, a product may be enclosed in packaging for shipping, e.g. cardboard box packaging, with the exterior of the packaging including a label detailing information relating to the product included in the packaging. As another example, the exterior of a product itself, e.g. a plastic exterior, may include a label in the form of a nameplate that includes information detailing aspects of the invention.

Such products may for instance include electrical products such as a circuit breaker. The labelling of a circuit breaker may include information such as: a catalogue number; a style number; a current rating; temperature rise; number of poles; a reference to a UPC (Universal Product Code) number; information required for UL (Underwriters Laboratories) certification; and, a date code. The labelling may also include a logo and/or trademark associated with the product. The labelling may further include a barcode (e.g. a one-dimensional barcode or a QR (Quick Response) code) that may provide a link to a website of the product manufacturer, for instance. In addition, the labelling may include a serial number of the product. In some cases, labelling information may be laser-marked directly onto the product, while in other cases the labelling information may be printed on a label that is attached to the product, e.g. a sticky-back label.

One way of verifying the authenticity of a product is to scan a barcode provided on the product. If the barcode does not link to a manufacturer website, or other destination, as intended then this may be an indication that the product is not authentic. Similarly, a serial number provided on the product may be checked against a relevant database to ensure the serial number is valid, thereby providing an indication of authenticity.

In addition to the above, there may be different aspects associated with a product's labelling that may be indicative of whether the product is authentic or not. For instance, one or more pieces of information that should be present on a given label—such as one or more of the examples given above—may be incorrect or missing from the product label. As one example, a date code may be missing from a product label. The presence and accuracy of a date code on a product label may be important to understand whether the product being purchased is new or second hand. Such a date code may be removed from labelling of a counterfeit product to attempt to obscure the age of the product, for instance. As another example, certain information may include errors such as typographical errors that are indicative that the product may not be genuine. The layout of information on a label may be different from a standard layout, i.e. a layout found on an authentic product, which may be another indicating factor of a lack of product authenticity. A lack of quality of one or more aspects of a label may be a further indicating factor. For instance, defects in the inkjet of a printed label may result in imprecise print quality on a label (e.g. blurry text), which may raise a suspicion regarding product authenticity. Incorrect information, such as an out-of-date logo may be a further indicator that a product is not genuine.

The invention may use different techniques to analyse different parts of a product's labelling to identify aspects that may be indicative that the product is not authentic. As outlined above, this could include inaccurate or missing information, incorrect sizing or positioning of information within the label, poor display quality of label information (e.g. blurred text or images/logos), etc.

Another way in which an indication of the authenticity of a product may be ascertained is by considering different aspects of the product itself. These aspects may for instance include the colour, size, shape, surface characteristics, etc., of the product. The invention therefore may use different techniques to analyse different parts of a product's exterior/casing to identify aspects that may be indicative that the product is not authentic.

The invention beneficially uses a combination of machine learning and image processing techniques to make a determination of whether a product is a counterfeit. Using a combination of such techniques to analyse different aspects of the product can increase the accuracy of the determination. Also, although some indicators that a product is not genuine may be apparent by human inspection, others may not. Hence, the provision of methods and systems in accordance with the invention that automatically detect and analyse different aspects of a product to determine whether it is genuine is beneficial.

In the below, specific techniques for analysing different aspects of the labelling and/or exterior of a product in accordance with examples of the invention are described in more detail, in particular to provide an indication of a product's authenticity.

FIG. 1 schematically illustrates a product 10 that includes a label 12 with various types of information relating to the product 10. In the illustrated example, the product 10 is in packaging, e.g. cardboard packaging for shipping, and the label 12 is attached to the outside of the packaging so that it is visible externally. In the described example, the product 10 is a circuit breaker and the label 12 includes information relating to the circuit breaker. In particular, an upper, left-hand region of the label 12 includes a logo 121 of the product manufacturer. Below this is a catalogue number 122 of the circuit breaker 10, followed further down by text 123 stating the type of product. The label 12 also includes an amperage rating 124, a calibration 125, a voltage rating 126, the number of poles 127, an interrupt rating 128, and a trip type 129 of the circuit breaker. Towards a lower, left-hand region of the label 12 is also included a UPC number 130 and a barcode 131 associated with the product 10. It will be understood that the various types of information indicated on the label 12 are for illustrative purposes only, and that different labels will include different types, and a different amount, of information.

FIG. 1 also schematically illustrates a portable computing device 14 which, in this particular example is a mobile telephone device. The portable device 14 includes one or more sensors for acquiring data relating to the product label 12 and/or other aspects of the product 10. The sensors may include an image sensor in the form of a camera. Other portable devices may include additional sensors such as an infrared or laser sensor, for instance. The portable device 14 also includes one or more computer processors for analysing and processing the acquired sensor data in order to make one or more determinations relating to the authenticity of the product 10. This will be described in greater detail below.

Figure 2:
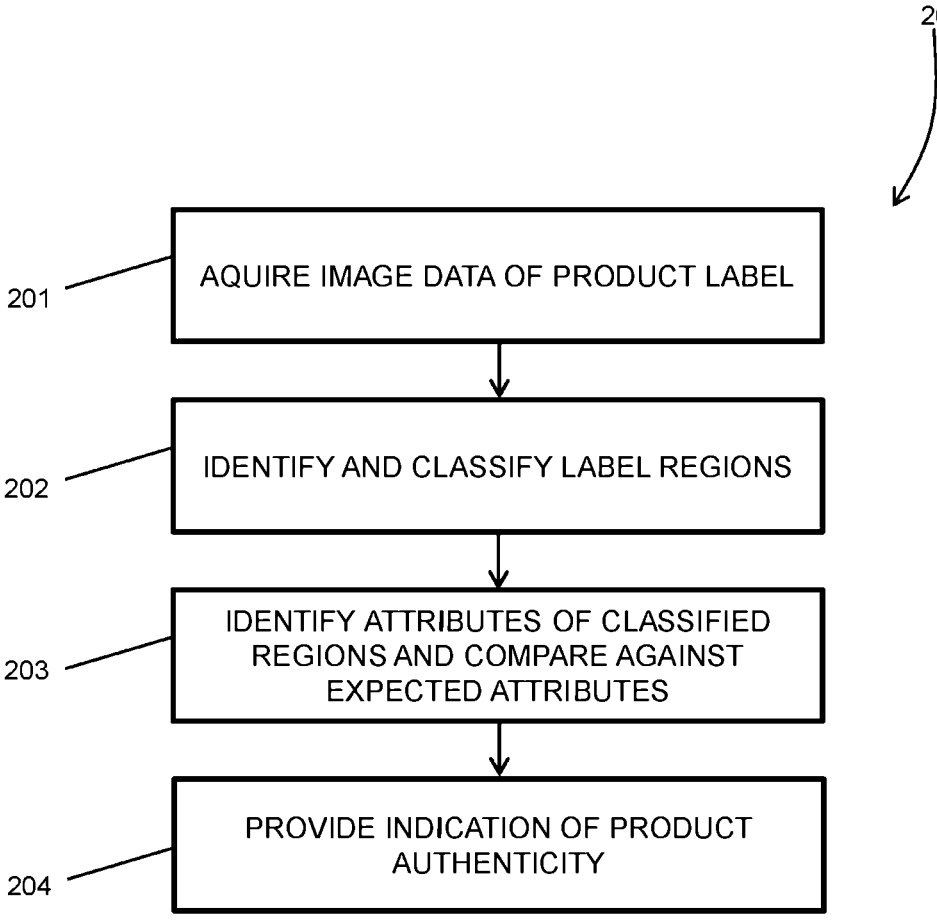
FIG. 2 illustrates steps of a method performed by the device in FIG. 1 for determining an authenticity of the product of FIG. 1 based on sensor data relating to the product label.

FIG. 2 shows the steps of a method 20 of determining authenticity of the product 10 in accordance with an example of the invention. At step 201, the method 20 includes acquiring image data indicative of at least one image including the label 12 of the product 10. As outlined above, the label 12 includes information related to the product 10. The image data is acquired using an image sensor which, in the described example, is a camera of the portable device 14. The camera may acquire more than one image of the label 12, e.g. images of different parts/sections of the label 12, or images from different angles relative to the label 12.

At step 202, the method 20 involves identifying one or more regions of the label 12 that include information related to the product 10. This may be performed using a machine learning algorithm, in particular a classification algorithm such as a multiclass algorithm. The multiclass algorithm may be trained on a labelled training dataset using supervised learning. The training dataset may include a collection of images of labels of a representative selection of different (genuine) products. Different regions of each label in the training set that include items of interest that may be analysed are labelled with the relevant class of item or form of information contained in the region. For instance, the different item classes or form of information could include text, barcodes, QR codes, logos/images, etc. The regions of interest may be represented by coordinates indicating relative positioning of the region within the label. A region of interest may typically be defined as a rectangular box around an item of interest. The training set may also include data that has been collected and labelled for different counterfeit products as this may assist the algorithm in distinguishing genuine and counterfeit labelling. The machine learning model may be trained using the portable device 14 or, alternatively, may be trained on a personal computer, server, or other central processing unit, with the trained model then being provided to the portable device 14 (e.g. by download).

The image acquired at step 201 is used as input to the trained machine learning multiclass algorithm and a single forward pass (inference) of the trained algorithm is performed or executed. The image may be a greyscale or colour image. The algorithm determines coordinates defining one or more regions of interest in the acquired image, i.e. regions defining where in the label items of interest are located. The algorithm analyses the item within each identified region and classifies each item as being in a specific category, or being a certain form of information, e.g. text, image, barcode, etc. This classification may involve the algorithm determining a probability of a particular item belonging to the different types of categories, and assigning the item to the category with the highest probability.

Prior to identifying the regions of interest of the label 12, the method may include normalising a projection of the acquired image. This may allow for more accurate analysis of the acquired label image. The normalisation may include first identifying the edges of the label 12 in the acquired image(s). For instance, in the case of a rectangular label 12, this identification process may return coordinates of the label 12 in the acquired image, e.g. in the form $(x_n, y_n)$, where n=1, 2, 3, 4. The identification process may be performed using an image processing technique.

If the camera acquiring the image is at an angle relative to the label 12, for instance, then the label 12 may not appear as a rectangle in the image. The projection normalisation may therefore include a step of scaling the identified coordinates $(x_n, y_n)$ such that a rectangular region in the image representing the label 12 is obtained. The extent of the normalisation/scaling needed to obtain the rectangular region may influence the error that can be expected in the subsequent steps analysing the acquired image. For instance, for an image where a relatively large amount of scaling is needed for normalisation, then it may be expected that more errors will occur in steps such as machine learning to identify the regions of interest (as described above) and optical character recognition (OCR) to identify text in the label 12 (as will be described below). This expected error may be factored in when making a determination of product authenticity based on the outcome of machine learning or OCR steps.

At step 203, the method 20 includes, for each classified region from step 202 of the label 12, identifying one or more attributes of the respective classified region based on the acquired image data. The attributes may include content of the information of the classified region within the label 12. The content could be information such as the content illustrated in the label 12, i.e. a manufacturer trademark or logo 121, a catalogue number 122, a product type 123, an amperage rating 124, a calibration 125, a voltage rating 126, the number of poles 127, an interrupt rating 128, a trip type 129, or a UPC number 130. The content could also be a serial number, a date code, an UL (Underwriters Laboratories) certification, barcode, other images, or any other suitable type of content.

This attribute identification process may be performed by a machine learning model such as an OCR algorithm as mentioned above. In particular, the model may be trained using techniques such as backpropagation or other techniques for optimising weights and other architecture parameters of the model. The model may be trained using a training set including appropriate representations of content, and may include content representative of counterfeit as well as genuine product labels as before. For instance, the training set may include text or a character string indicating a catalogue number of a genuine product where the text is the size and font that would be found on a genuine product label. The training set may also include individual characters from character strings that may be found on a label.

For a particular region of interest, the attribute identification may involve executing the trained model, e.g. OCR model, taking an image of each character from the respective region as input. The model will classify/identify what each character is (e.g. a particular letter or number) based on which character class has the highest probability in the multiclass algorithm. The step of identifying the attributes may include determining a confidence score associated with the identification. This confidence score may be based on the relative probability determined by the algorithm. For instance, if a particular character is classified with a relative high probability by the algorithm then the confidence score associated with that identified character may be relatively high.

As well as identifying what each character is (e.g. a particular letter or number), the attribute identification may also include identifying other attributes of the character in the acquired image, for instance display characteristics such as character font, size, colour, etc., as well as a print quality/blurriness of the character.

Step 203 of the method then involves comparing the identified attributes against respective expected attributes for a label region of an authentic product that includes the determined type of information of said classified region. That is, for a region that includes information determined to be text, then it may be expected that each character in the region is an alphanumerical character and, if one of the characters is identified as a special character (e.g. a mathematical symbol), for instance, then this may be regarded as unexpected and therefore possibly indicative of a counterfeit. Similarly, if a font or size of the identified character is different from what is expected then this may be indicative of a counterfeit product. Furthermore, an unexpected print quality may also be indicative of a counterfeit product.

The identified attributes of a label region may also be used to identify what information is included in the region (if this has not already been done), and the comparison step can involve whether the information of a region is as expected for a given product. For instance, if the identified attributes of a region are identified as being '30 AMPS', then this is recognised as an amperage of the product 10. It may then be checked what an expected amperage for such a product, and this can be checked against the identified attributes to ensure that the amperage on the label 12 is in line with what is expected.

A further attribute of each region of interest that may be considered is the relative location of the region in the label 12. The coordinates of each region in the label may have previously been determined when identifying regions of interest. The labelling of certain products likely have a standard layout with certain information always being included in a certain part/area of the label. For instance, as shown in FIG. 1, the manufacturer logo 121 may always be included in an upper, left-hand part of the label 12. If a certain identified region of interest is determined to include certain content, e.g. a manufacturer logo, then the identified position of the region in the label may be compared to an expected position of such content in a genuine product label. If the positioning of the content is not as expected in the label image, then this may be indicative of the product being counterfeit.

The identification of relative locations may be performed based on a centroid technique. For instance, a width to length ratio of the label 12 may be calculated, and the coordinates of the central pixels of the label may be determined. A machine learning model may be used to detect objects such as images, e.g. a fast region-based convolutional neural network (R-CNN) or a you-only-look-once (YOLO) model. The centroid location of each region may then be determined and the distance from the centre of the region to the label centre may be normalised relative to the overall width to length ratio.

The expected attributes used in the comparison step may be stored in a database located either on the portable device 14 itself, or at a remote storage location, in which case the portable device 14 communicates (e.g. wirelessly) with the remote database to perform the comparison step.

The method may further include analysing a barcode 131 of the label 12. For instance, a scanning device may be used to scan the barcode 131 on the label 10. In some examples, the scanning device is the portable device 14. As input, a user may take a picture/photograph of a barcode, QR code or serial number on the label 12. The method may then involve accessing a database to check whether the barcode, QR code or serial number corresponds to an authentic product. Barcode analysis may be conducted using a standard image processing approach. A similar analysis may be used for other codes such as serial number or QR codes. Serial numbers may be analysed using OCR techniques. The result of this check may be the name and product category, as well as an image of the expected product.

At step 204, the method 20 involves providing an indication of authenticity of the product 10 determined based on the above comparison steps. That is, the indication of authenticity may be determined based on one or more of the comparisons outlined above. A greater number of features of the label that are considered, the more accurate the overall authenticity determination may be. It may be that the identification of only a single unexpected feature in the various comparison processes is sufficient for the product to be flagged as potentially counterfeit, or a certain number or percentage of unexpected features may need to be identified for this result. The determined indication may be in the form or a binary result—i.e. genuine or authentic—or the indication may be provided on a scale—e.g. between 0 and 1—of how probable it is that the product 10 is counterfeit.

The indication of authenticity may be determined based on the confidence score of the identified attributes relative to the expected error determined based on the projection normalisation as described above. For instance, a higher expected error may mean that a lower confidence score is not necessarily indicative of a counterfeit product.

The indication could be in the form of a warning signal from the portable device 14. For instance, if the product 10 is determined to be counterfeit, or the probability that it is counterfeit is greater than a prescribed threshold, then a warning may be emitted to the user, e.g. a sound or visual warning, or the warning may be stored in a database.

Although the above example is described with reference to analysing a label on exterior packaging enclosing the product 10, additionally or alternatively a corresponding analysis may be performed based on another label associated with the product 10, e.g. a nameplate on an exterior surface/casing of the product 10, or any other suitable label including information relating to the product.

Figure 3:
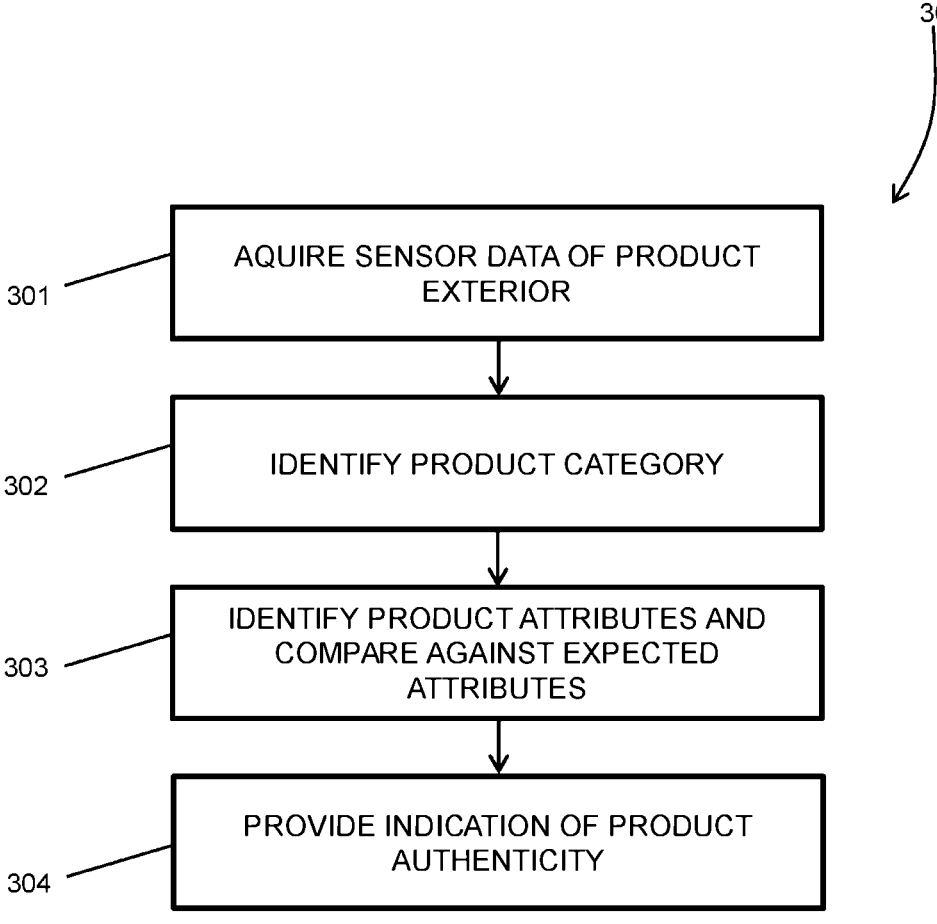
FIG. 3 illustrates steps of a method performed by the device in FIG. 1 for determining an authenticity of the product of FIG. 1 based on sensor data relating to the product exterior; and, FIG. 4 illustrates steps of a method of making an overall determination of authenticity of the product of FIG. 1 based on determinations made according to the methods of FIG. 2 and/or FIG. 3.

FIG. 3 shows the steps of a method 30 of determining authenticity of the product 10 in accordance with an example of the invention. Whereas the method 20 of FIG. 2 relates to analysing labelling associated with the product 10, the method 30 of FIG. 3 relates to analysing the exterior of the product 10. At step 301, sensor data indicative of an exterior of the product 10 is acquired. This may be performed using the same sensor as used to acquire the image data in FIG. 2, i.e. a camera of the portable device 14. Alternatively, this sensor data many include radar data, acquired from a radar sensor, which may be part of or separate from the portable device 14. For instance, a laser may be used to acquire such sensor data.

At step 302, the method involves identifying a category of the product, from a plurality of potential product categories, by executing a trained machine learning model based on the acquired sensor data. In one example, the potential categories may be different types of electrical products, e.g. circuit breakers, fuses, batteries, etc. There may be a defined number of potential product categories to select from. The sensor data may be image data in the form of a photograph of the product 10. The sensor data may also include multiple photographs of the product 10 from different angles, for instance. In such a case, image stitching may be performed. This could be performed using a video input to create a more detailed visual model of the product 10, so that more accurate category classification may be performed.

The machine learning model for performing category classification may for instance be a neural network model including two-dimensional convolutional neural network layers, densely connected layers, dropout during model training, batch normalisation, multiple branches, and multiple classes. The model may be trained on a platform such as a laptop or server, and then the trained model can be executed by a portable device such as the mobile device 14. The model may be pruned to be run on such a portable device, such as by reducing the number of layers or neurons. Alternatively the model may be quantised (e.g. from 32 bit to 8 bit data) to be run on such a portable device.

The category classification may therefore involve accessing model weights and architecture that have been trained on a labelled dataset. The model may then implicitly inspect the sensor data input into the model for product features such as switches, screw holes, etc., in order to classify the product 10 into the correct category.

At step 303, the method 30 involves identifying one or more attributes of the product 10 based on the acquired sensor data, and comparing the identified attributes against respective expected attributes for an authentic product in the identified category. A relevant database of the identified product category may be accessed in order to access expected attributes of products in the relevant category. The database may be accessible irrespective of the classification made by the model, so that a user can compare images of the product 10 against images of an authentic product, by inspection.

The attributes may include a colour of at least one part of the product 10. The comparison step may then include comparing the colour determined from the sensor data against an expected threshold colour range of the at least one part for an authentic product. In one example, a colour of a logo or trademark included in the sensor data is compared to an expected colour. In another example, a colour of the exterior product housing or casing is compared against an expected colour for such a product.

Such colour variation analysis may use a physics-based approach. In one example, the analysis may be performed in dependence on an ambient light level obtained from the sensor data. The analysis may involve an evaluation of image saturation. The relative colour on different parts of the product may be influenced by the nature of the ambient lighting in which the image is obtained. A confidence in the analysis may increase if the acquired image is not saturated by light. For instance, if the image is 8-bit, i.e. values from 0 to 255, it may be important to ensure that there are not an excessive number of 255 values as this may indicate image saturation. The illumination source may be identified based on the absorption pattern of light. A photograph of a trademark or logo may be influenced by ambient lighting. For example, if the photograph is taken with a smartphone then there may be a bright flash.

The colour variation analysis may involve identifying a colour of a logo, text or the product housing, and optionally the colour gradient, and assigning the feature to an appropriate colour space, e.g. CIE 1931, true colour, greyscale, etc. This may be influenced by the ambient lighting. For example, if green light is predominant in the ambient light, or the environment is dimly lit, then the analysis may be adjusted to compare the contrast of different colour spectrum components.

A colour database may then be queried based on the identified colours of the product 10. For instance, in respect of trademarks across different products for the same company, the colour scheme may be the same or similar. The trademarks may have very similar fonts and dimensions. The analysis may involve checking whether the colour variance is beyond allowable threshold.

The product attributes may include dimensions of one or more parts of the product 10. Dimension analysis may be performed using image processing techniques. Physics-based models may analyse the product dimensions based on the acquired sensor data, e.g. two-dimensional images. The relative dimensions may be characterised, e.g. the width to length ratio of a circuit breaker box. The determined dimensions may be compared against expected dimensions for an authentic product. This may also be used as a tool for error identification, e.g. a crack in a circuit breaker, which may lead to safety concern. Dimension analysis may support determination of an American versus European light switch, for example, or an American versus European plug socket.

The product attributes may include a shape of at least a part of the product 10. In particular, this may be a laser analysis of the product shape, where the sensor data is acquired laser data. In an example, this technique may be implemented if a confidence level for distinguishing fraudulent and authentic goods is below a certain predetermined threshold. Such a technique may involve time of flight imaging to determine the shape of the product 10. This can improve the accuracy of the estimation of shape relative to a computer vision estimate. The determined shape may then be compared against a lookup table of expected product shapes.

The product attributes may include a roughness of a surface of the product 10, e.g. a surface of the product exterior such as the product housing. Analysis of surface roughness may also be based on acquired laser sensor data associated with the product 10. In an example, this technique may be implemented if a confidence level for distinguishing fraudulent and authentic goods is below a certain predetermined threshold. The technique may involve illuminating an area of the product 10 with a laser, and deploying an optical image system based on a defined aperture and focal length. A mean speckle size may be determined. This is based on the optical system. The speckle size is also proportional to the surface roughness and quality of the surface finish. This may be a result of an injection moulding process used to form the product housing, for instance. This speckle size gives insight into the authenticity of the product 10, as it may be checked against a database indicating an expected speckle size of the product surface. For instance, use of a different type of plastic in a counterfeit product may have a different surface roughness from the plastic used in the genuine product.

At step 304, the method 30 involves providing an indication of authenticity of the product determined based on the comparison in step 303. Similarly to step 204 in FIG. 2, the indication of authenticity may be determined based on one or more of the comparisons outlined above. A greater number of features (e.g. colour, shape, surface roughness, etc.) of the product 10 that are considered, the more accurate the overall authenticity determination may be. It may be that the identification of only a single unexpected feature in the various comparison processes is sufficient for the product to be flagged as potentially counterfeit, or a certain number or percentage of unexpected features may need to be identified for this result. The determined indication may be in the form or a binary result or on a scale of how probable it is that the product 10 is counterfeit.

Figure 4:
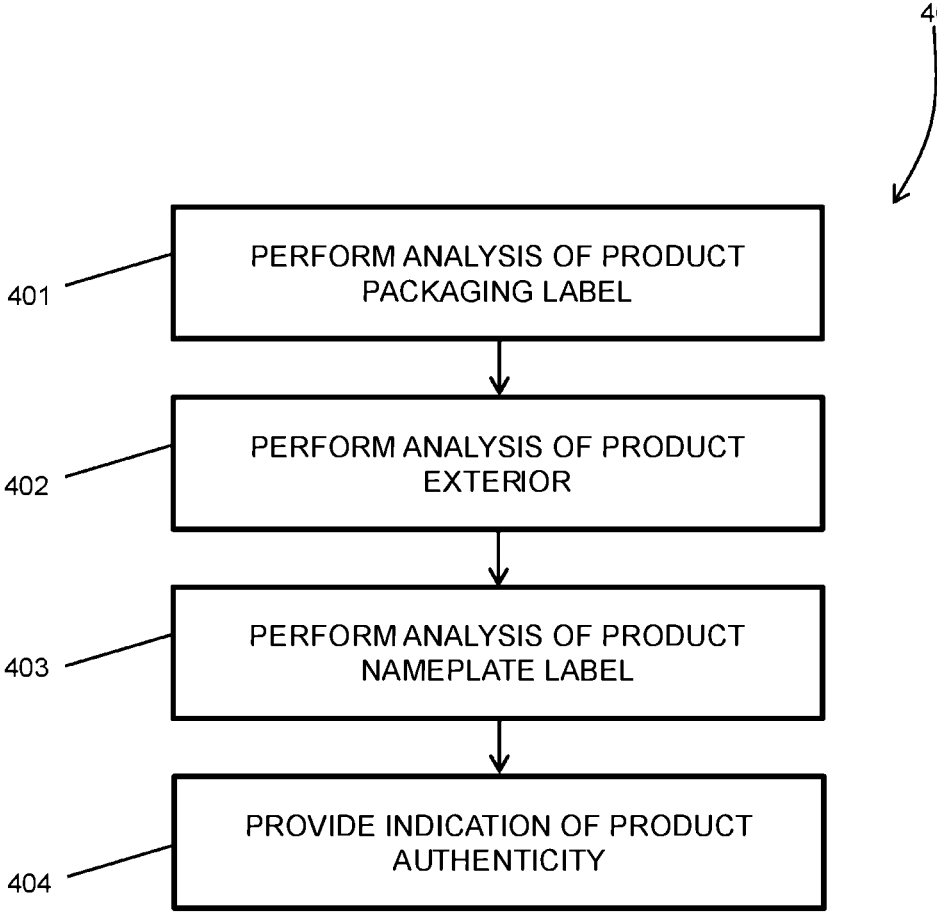

FIG. 4 shows steps of a method 40 for combining an analysis of different parts of the product 10 to make an overall determination as to whether the product 10 is a counterfeit. Step 401 involves analysing the label 12 of packaging enclosing the product 10. This step may be performed according to the method 20 of FIG. 2, and described in detail above. Step 402 involves analysing a nameplate on an exterior housing or casing of the product 10. As mentioned above, such a nameplate may include similar information to that included on the packaging label 12. This step may also be performed according to the method 20 of FIG. 2. Step 403 of the method 40 involves analysing the exterior of the product 10, e.g. the exterior housing. This step may be performed according to the method 30 of FIG. 3, and described in detail above.

Each of the steps 401, 402 and 403 may provide an individual indication as to whether the product 10 is counterfeit. At step 404 an overall determination may be made by combining these individual indications. In one example, this combination may be made by means of a simple, weighted average. Such weights may be tuned as appropriate. For instance, a greater weighting may be given to analysis of one part of the product 10 where the confidence in the result is greater.

It will be understood that the combination of the three analyses indicated in steps 401, 402 and 403 is for illustrative purposes only and is not restrictive. In particular, it will be understood that the overall determination may be based on a combination of two of the steps 401, 402 and 403. It will also be understood that further similar analyses may be performed on different parts of a product, and that such analyses may similarly be included in the overall determination of product authenticity.

Many modifications may be made to the above-described examples without departing from the scope of the appended claims.

The method based on label analysis may include identifying a category of the product, based on the acquired image data, by accessing a database storing image data relating to a plurality of potential product categories. The expected attributes used for comparison for each label region may then be based on the identified product category.

Although the above examples are described with reference to use of a mobile telephone device—which is advantageous for reasons of convenience and cost—it will be understood that different, perhaps dedicated, portable devices may be used for acquiring the sensor (image) data and performing the processing steps. Indeed, it will also be understood that a non-portable device can alternatively be used for performing methods in accordance with the invention.

The invention claimed is:

1. A method of determining authenticity of a product, the method comprising:
  (a) acquiring image data, using an image sensor, indicative of at least one image including a label of the product, the label including information related to the product;
  (b) identifying a plurality of regions of the label that include information related to the product, and classifying each identified region based on a determined form of information included in said region, wherein the determined form of information includes text, barcodes, images, Quick Response (QR) codes or logos, the identification and classification steps being performed by executing a trained machine learning model based on the acquired image data, wherein classifying the identified regions of the label comprises determining coordinates defining a position of each identified region within the label, wherein at least two regions of the label have a different classification, wherein identifying the plurality of regions comprises:
  normalizing a projection of the acquired image data, the normalizing comprising:
    identifying coordinates of the label; and
    scaling the identified coordinates such that a rectangular region of the label is obtained;
  (c) for each classified region of the label, identifying one or more attributes of said classified region based on the acquired image data, and comparing the identified attributes against a selected set of one or more attributes from a plurality of expected attributes, wherein the plurality of expected attributes correspond to a label region of an authentic product that includes the determined form of information of said classified region, wherein the selected set of one or more attributes is derived from the plurality of expected attributes based on the one or more attributes of said classified region, wherein the one or more attributes comprise the position of the classified region within the label, and wherein the comparison of the identified attributes comprises comparing the position of the classified region relative to an expected position of the respective label region of the authentic product that includes the determined form of information of the classified region; and
  (d) providing an indication of authenticity of the product determined based on the comparison in the form of an audio-visual warning.

2. The method according to claim 1, wherein the machine learning model is trained using a training dataset comprising a plurality of training samples each including product label image data and associated classified regions indicating the type of information in the respective regions.

3. The method according to claim 2, wherein the training dataset includes training samples related to authentic product labels, training samples related to counterfeit product labels, or a combination of both.

4. The method according to claim 1, wherein the attributes include at least one among:
  content of the information of the classified region within the label, and wherein the comparison step includes comparing the content of the classified region relative to expected content of a label region of an authentic product that includes the determined type of information of said classified region; and
  one or more display characteristics of content in the classified region, and wherein the comparison step includes comparing the display characteristics of the classified region relative to expected display characteristics of a label region of an authentic product that includes the determined type of information of said classified region.

5. The method according to claim 4, wherein the content includes at least one of: a serial number; a date code; a catalogue number; a UL (Underwriters Laboratories) certification; product amperage; product temperature rise; product style number; number of poles of products; and a UPC (Universal Product Code) number.

6. The method according to claim 1, wherein the attributes include one or more display characteristics of content in the classified region, wherein the comparison step includes comparing the display characteristics of the classified region relative to expected display characteristics of a label region of an authentic product that includes the determined type of information of said classified region and wherein the display characteristics include at least one of colour, size, font, resolution, and fading of the content, and wherein the content includes one or more alphanumeric or special characters, or a logo or image.

7. The method according to claim 1, the method comprising:

identifying coordinates in the acquired image data that define edges of the label;

determining a scaling factor to be applied to the coordinates to obtain a rectangular area defining the label; and determining an expected error in the step of identifying the attributes of each classified region, wherein the step of identifying the attributes comprises determining a confidence score associated with the identification, and wherein the indication of authenticity is determined based on the confidence score relative to the expected error.

8. The method according to claim 1, the method comprising:

scanning, using a scanning device, a barcode on the label; and, accessing a database to check whether the barcode corresponds to an authentic product, wherein the indication of authenticity of the product is determined based on the barcode check.

9. The method according to claim 1, the method comprising identifying a category of the product, based on the acquired image data, by accessing a database storing image data relating to a plurality of potential product categories, wherein the expected attributes for each label region are based on the identified product category.

10. The method according to claim 1, wherein the acquired image data includes data indicative of two or more labels of the product, the method comprising performing steps (b), (c) and (d) for each of the two or more labels, and the method comprising providing an overall indication of authenticity of the product determined based on the respective indication of authenticity for each of the two or more labels.

11. The method according to claim 1, the method comprising:

acquiring sensor data indicative of an exterior of the product;

identifying a category of the product, from a plurality of potential product categories, by executing a trained machine learning model based on the acquired sensor data;

identifying one or more attributes of the product based on the acquired sensor data, and comparing the identified attributes against the selected set of one or more attributes for an authentic product in the identified category; and, providing an indication of authenticity of the product determined based on the comparison.

12. The method according to claim 11, wherein the one or more attributes includes a colour of at least one part of the product, and wherein the comparison step includes comparing the colour determined from the sensor data against an expected threshold colour range of the at least one part for an authentic product, and wherein the at least one part is a logo or trademark included in the sensor data, or a product housing included in the sensor data.

13. The method according to claim 11, wherein the one or more attributes include one or more dimensions of the product, and wherein the comparison step includes comparing the dimensions determined from the sensor data against expected dimensions for an authentic product.

14. The method according to claim 12, wherein the sensor data includes visual data, acquired from a visual sensor, indicative of a visual of the exterior of the product, and wherein the visual sensor is the image sensor.

15. The method according to claim 11, wherein the sensor data includes radar data, acquired from a radar sensor, wherein the one or more attributes includes at least one among a shape of the product, and wherein the comparison step includes comparing the shape determined from the sensor data against an expected shape for an authentic product; and a roughness of an exterior surface of the product, and wherein the comparison step includes comparing the roughness determined from the sensor data against an expected surface roughness for an authentic product.

16. The method according to claim 11, the method comprising providing an overall indication of authenticity of the product determined based on the respective determined indications of authenticity.

17. The method according to claim 1, the method further comprising:

acquiring sensor data indicative of an exterior of the product;

identifying a category of the product, from a plurality of potential product categories, by executing a trained machine learning model based on the acquired sensor data;

identifying one or more attributes of the product based on the acquired sensor data, and comparing the identified attributes against the selected set of one or more attributes for an authentic product in the identified category; and, providing an indication of authenticity of the product determined based at least in part on the comparison.

18. The method according to claim 1, wherein determining the indication of authenticity of the product comprises:

calculating a confidence score that the product is counterfeit, based on the comparison; and providing the audio-visual warning signal indicating that the product is counterfeit, based on determining that the calculated confidence score is greater than a preterminal threshold.

19. The method according to claim 1, wherein identifying the one or more attributes of the classified region comprises:

determining a relative location of the classified region in the label, wherein determining the relative location of the classified region comprises:

determining a width to length ratio of the label;

determine coordinates of a set of central pixels of the label;

determining a centroid region of the classified region and calculating a distance of the centroid region from the set of central pixels; and normalizing the distance based on the width to length ratio.

20. A portable device for determining authenticity of a product, the portable device comprising:

an image sensor configured to acquire image data indicative of at least one image including a label of the product, the label including information related to the product;

a processor configured to:

identify a plurality of regions of the label that include information related to the product, and classify each identified region based on a determined form of information included in said region, wherein the determined form of information includes text, barcodes, images, Quick Response (QR) codes or logos, the identification and classification steps being performed by executing a trained machine learning model based on the acquired image data, wherein classifying the identified regions of the label comprises determining coordinates defining a position of each identified region within the label, wherein at least two regions of the label have a different classification, wherein identifying the plurality of regions comprises:

normalizing a projection of the acquired image data, the normalizing comprising:

identifying coordinates of the label; and scaling the identified coordinates such that a rectangular region of the label is obtained; and for each classified region of the label, identify one or more attributes of said classified region based on the acquired image data, and compare the identified attributes against a selected set of one or more attributes from a plurality of expected attributes, wherein the plurality of expected attributes correspond to a label region of an authentic product that includes the determined form of information of said classified region, wherein the selected set of one or more attributes is derived from the plurality of expected attributes based on the one or more attributes of said classified region, wherein the one or more attributes comprise the position of the classified region within the label, and wherein the comparison of the identified attributes comprises comparing the position of the classified region relative to an expected position of the respective label region of the authentic product that includes the determined form of information of the classified region; and an output configured to provide an indication of authenticity of the product determined based on the comparison in the form of an audio-visual warning.

\* \* \* \* \*